United States Patent Office 3,012,658
Patented Dec. 12, 1961

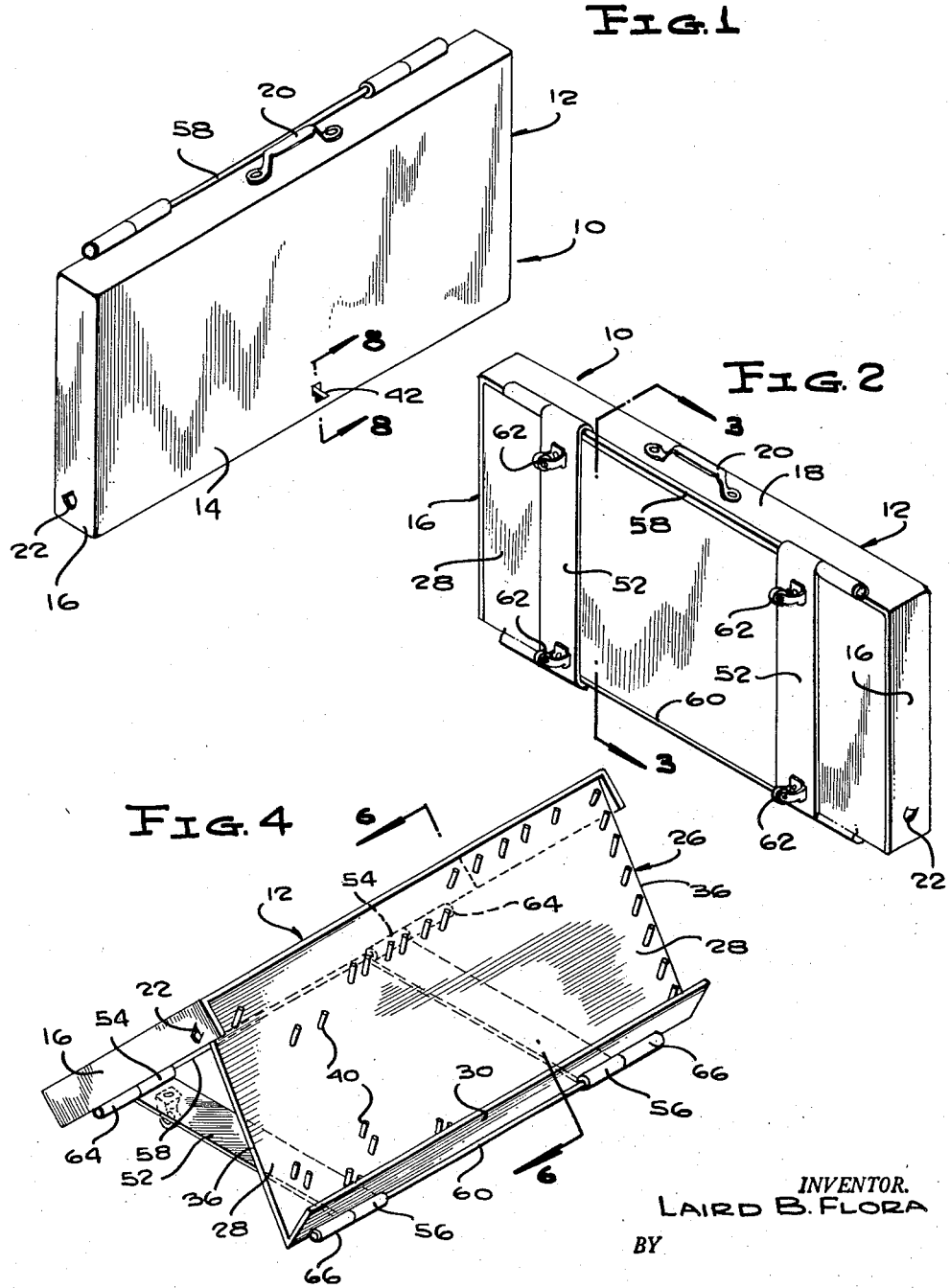

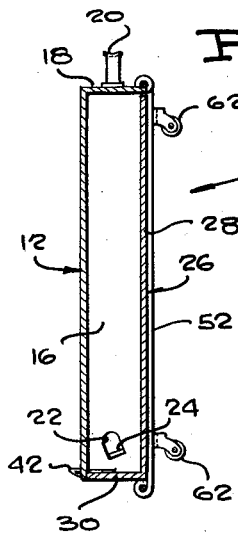
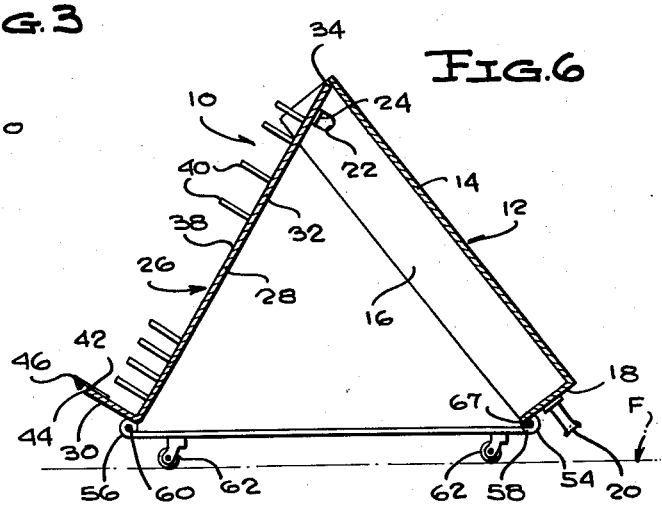
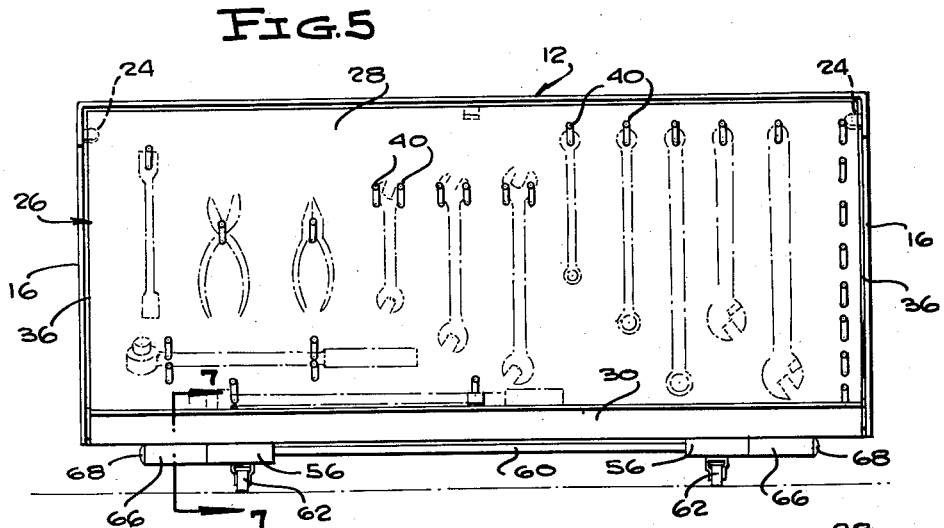
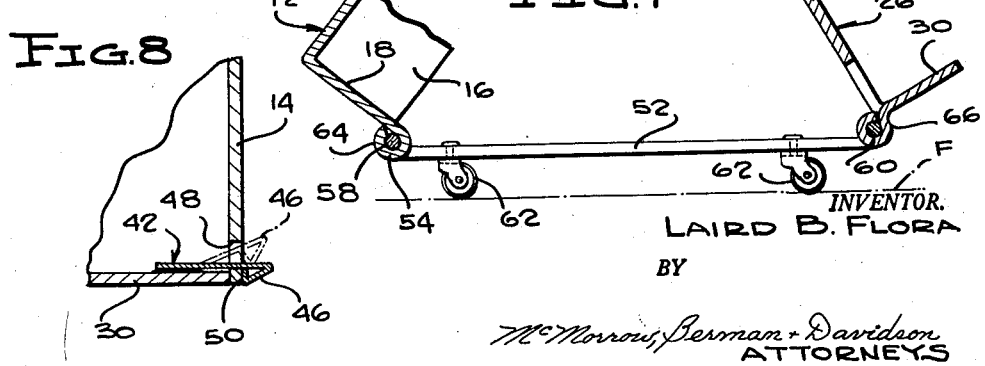
INVENTOR.
LAIRD B. FLORA

3,012,658
UNDER CAR TOOL KIT
Laird B. Flora, Rte. 1, Box 31N, Jefferson, Oreg.
Filed June 26, 1959, Ser. No. 823,240
1 Claim. (Cl. 206—16)

This invention relates to a novel roller-supported folding tool kit for use in repair work under automotive vehicles.

The primary object of the invention is to provide a portable tool kit of the kind indicated which, when folded closed forms a flat, compact form which can be readily pushed or pulled on its rollers into position beneath a car, whereat the kit is adapted to be unfolded so as to expose tools in readily visible and accessible positions from individually supported locations on the kit, the kit being rollable in its unfolded condition, to desired locations beneath a car. Use of a kit of the invention greatly facilitates the handy locating and the ready recognition of wanted tools, by a mechanic, as when reclining beneath a car on a dolly.

Another object of the invention is to provide a collapsible and portable tool kit of the character indicated above which is uncomplex in construction, being composed of a small number of simple and easily assembled parts, and which can be made in rugged and serviceable forms at relatively low cost.

Other important objects and advantageous features of the invention will become apparent from the following description and the accompanying drawings, wherein, for purposes of illustration only, a specific form of the invention is set forth in detail.

In the drawings:

FIGURE 1 is a perspective view of a tool kit of the invention in closed position;

FIGURE 2 is a perspective view showing the reverse side of FIGURE 1;

FIGURE 3 is a vertical transverse section taken on the line 3—3 of FIGURE 2;

FIGURE 4 is a perspective view showing the tool kit in unfolded condition;

FIGURE 5 is an enlarged side elevation, taken from the right of FIGURE 4, showing various tools, in phantom lines, individually supported on the kit;

FIGURE 6 is a vertical transverse section taken on the line 6—6 of FIGURE 4;

FIGURE 7 is an enlarged fragmentary vertical transverse section taken on the line 7—7 of FIGURE 5; and FIGURE 8 is an enlarged fragmentary vertical transverse section taken on the line 8—8 of FIGURE 1.

Referring in detail to the drawings, wherein like numerals designate like parts throughout the several views, the illustrated tool kit, generally designated 10, comprises substantially a pan-shaped outer section 12 of elongated rectangular form, having a flat top wall 14, flat end walls 16, and an upper side wall 18, but devoid of a lower side wall. Centered on the upper side wall 18 is an external handle 20 for carrying the kit 10 in its folded, closed condition. The end walls 16 are provided, at centered locations near to and spaced upwardly from the lower edges of the end walls, with diagonal half-round openings 22 resulting from punched out stop lugs 24.

The kit 10 further comprises an inner section 26 which comprises a flat bottom wall 28, and is devoid of end walls and an upper side wall, but has a lower side wall 30. The inner section 26 is of substantially the same shape as the outer section 12, but is sufficiently smaller in area than the outer section, to telescope therein, in the closed condition of the kit, as shown in FIGURES 2 and 3, in which situation the lower side wall 30 of the inner section 26 forms the bottom of the closed kit, in opposition to the upper side wall 18 of the outer section 12, as a top wall, and the top and bottom walls 14 and 28 of the sections constitute side walls of the closed kit.

The above mentioned pivot lugs 24 are in the form of flat ears which are engaged by the bottom wall 28 of the inner section bottom wall 28 close to the free upper longitudinal edge 34 of the bottom wall 28, for stopping the inner section, in the unfolded condition of the device, as seen in FIGURE 6.

Fixed on and projecting laterally outwardly from the inner surface 38 of the inner section bottom wall 28 is a considered distribution of tool-supporting means, such as pins 40, arranged as single and as pairs, on which are hung various mechanic's tools, as indicated in FIGURE 5, so that the tools are clearly recognizable, against the background of the bottom plate 28, and are easily reached and removed from and replaced on the pins 40.

Fixed on the inward or upper surface of the lower side wall 30 of the inner section 26, at the midlength point thereof, is a spring latch or catch 42 which has a free end portion reaching outwardly beyond the free longitudinal edge 44 of the lower side wall 30, and formed with an enlarged triangular cam head 46, to engage through a detent opening 48, provided in the top wall 14 of the outer section 12, near to the free lower longitudinal edge thereof, in the closed condition of the kit, as shown in FIGURES 3 and 8, in which situation the right angled inward end 50 of the latch head 46 bears retainably against the outer surface of the outer section top wall 14, so as to hold the kit closed.

The sections 12 and 26 have extending therebetween at one side thereof a pair of longitudinally spaced transversely elongated flat rigid strut or stretcher bars 52 which have fixed on their opposite ends longitudinal hinge barrels 54 and 56, respectively, through which related end portions of longitudinally elongated hinge pins 58 and 60, respectively, extend between the two strut bars 52. The hinge barrels 54 and 56 are upstanding from the upper surfaces of the strut bars. Caster wheels 62 are secured on the undersurfaces of the strut bars and are located close to opposite ends thereof, for supporting the kit, in its unfolded condition, on such as a garage floor F, and to rollably support the kit, when in closed condition.

Disposed at the longitudinally outward ends of and axially aligned with the strut bar hinge barrels 54 and 56 are hinge barrels 64 and 66 which are fixed on and extend downwardly from the upper side wall 18 of the outer section, at the free edge 67 thereof, and from the undersurface of the lower side wall 30 of the inner section 26, in line with the bottom wall 28 thereof, as seen in FIGURES 3 and 6, respectively, and have related end portions of the hinge pins 58 and 60 extended therethrough. Heads 68 on the outer ends of the hinge pins maintain them in place in the hinge barrels.

To fold the kit 10, to the open position shown in FIGURE 6, from the closed position shown in FIGURE 3, the latch 42 is disengaged from the detent opening 48, whereat the inner section 26 is swung out of the outer section 12, and the sections are then spread away from each other, until stopped by the lugs 24 and the strut bars 52, preferably at angles of about sixty degrees relative to each other. The sections are then in over-center relation to each other, so that the open condition of the kit is maintained, and the kit can be pushed or pulled around without danger of collapsing. The kit 10 is closed up, after use, simply by reversing the above manipulations, and re-engaging the latch in the detent opening, whereat the kit can be carried by the handle 20, without risk of its coming open.

The kit sections 12 and 26, and the strut bars 52, can be made of any suitable materials, including wood, plastics, fiber composition, and metals, including light-weight metals, in the interest of requisite strength and lightness in weight.

Although there has been shown and described herein a preferred form of the invention, it is to be understood that the invention is not necessarily confined thereto, and that any change or changes in the structure of and in the relative arrangements of components thereof are contemplated as being within the scope of the invention as defined by the claim appended hereto.

What is claimed is:

An under car tool kit consisting of a first section and a second section, said first section having a top plate having end walls thereon and a first longitudinal sidewall and devoid of a second longitudinal sidewall, said second section having a bottom plate devoid of end walls and having a first longitudinal sidewall, said second section being devoid of a second longitudinal sidewall, said second section being slightly shorter than said first section and adapted to be engaged in the first section between its end walls, strut bar means having an upper side, first hinge means on one end of the strut bar means hinging the strut bar means on the sidewall of the first section, second hinge means on the other end of the strut bar means hinging the strut bar means on the sidewall of the second section, said bottom plate of the second section having article supporting means thereon, said second section being swingable downwardly within the first section to bear upon said upper side of the strut bar means, and the first section being then swingable downwardly to bear upon the second section with the end walls and sidewalls of the sections bounding the ends and sides of the resultant enclosure, said sections being swingable upwardly from the strut bar means into angled intersecting relationship, and stop means on the first section end walls with which the second section is engageable to hold the sections in angled relationship, said article supporting means comprising elements extending outwardly from the bottom plate of the second section and exposed when the sections are in angled relationship, said strut bar means comprising longitudinally spaced strut bars, having first and second hinges on ends thereof comprising interengaged hinge barrels, and common hinge pins severally extending through the barrels of the first and second hinges.

References Cited in the file of this patent

UNITED STATES PATENTS

| | | |
|---|---|---|
| 677,108 | Weis | June 25, 1901 |
| 783,976 | Pinten | Feb. 28, 1905 |
| 1,113,832 | Roth | Oct. 13, 1914 |
| 1,314,915 | Trullench | Sept. 2, 1919 |
| 1,761,453 | Rankin | June 3, 1930 |
| 2,525,208 | Clink | Oct. 10, 1950 |
| 2,880,857 | Parsons et al. | Apr. 7, 1959 |